Nov. 8, 1966  A. A. MANDATO  3,283,798
TRACTION DEVICE
Filed Aug. 17, 1965  3 Sheets-Sheet 2

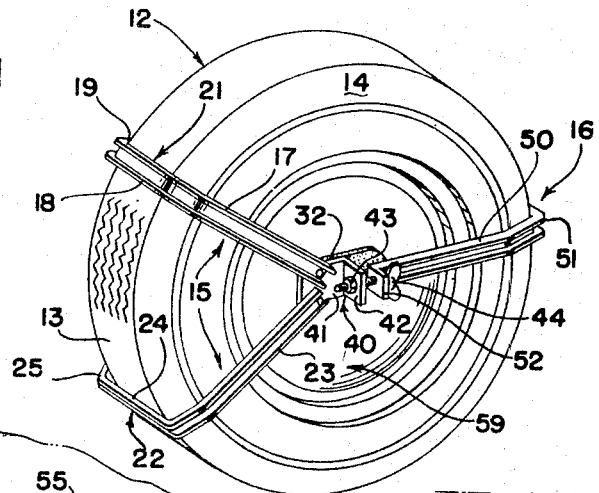
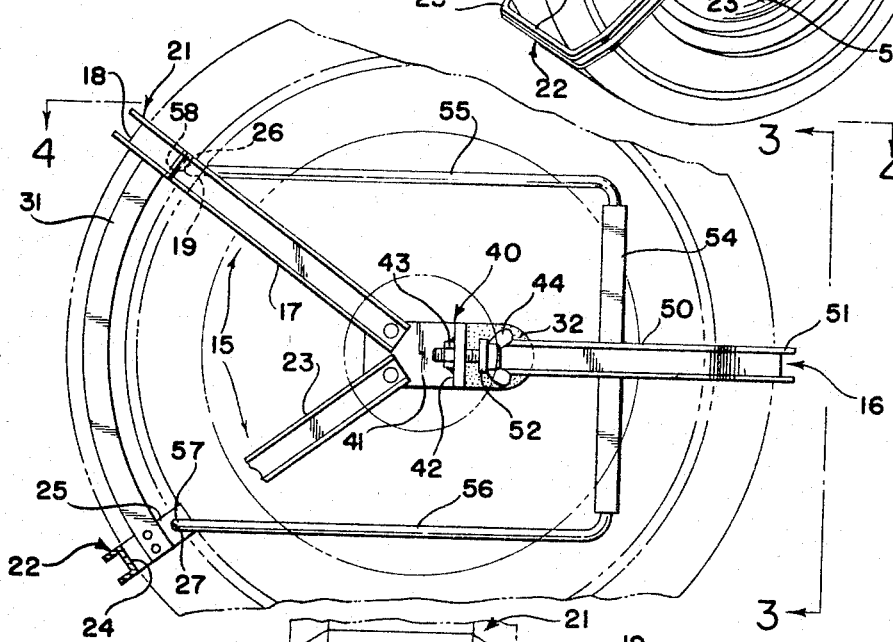
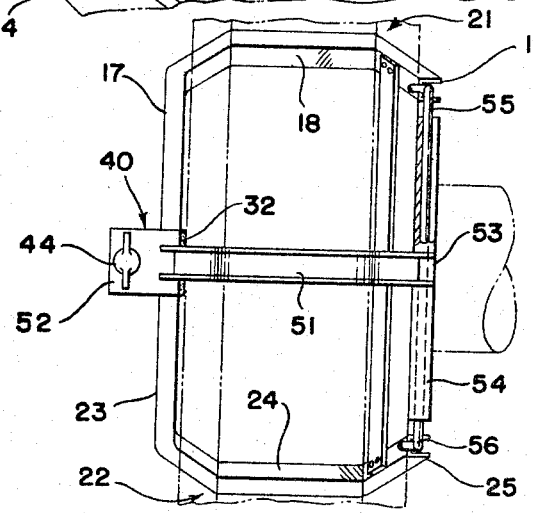
INVENTOR.
ANGELO A. MANDATO

INVENTOR.
ANGELO A. MANDATO
BY

ATTORNEYS

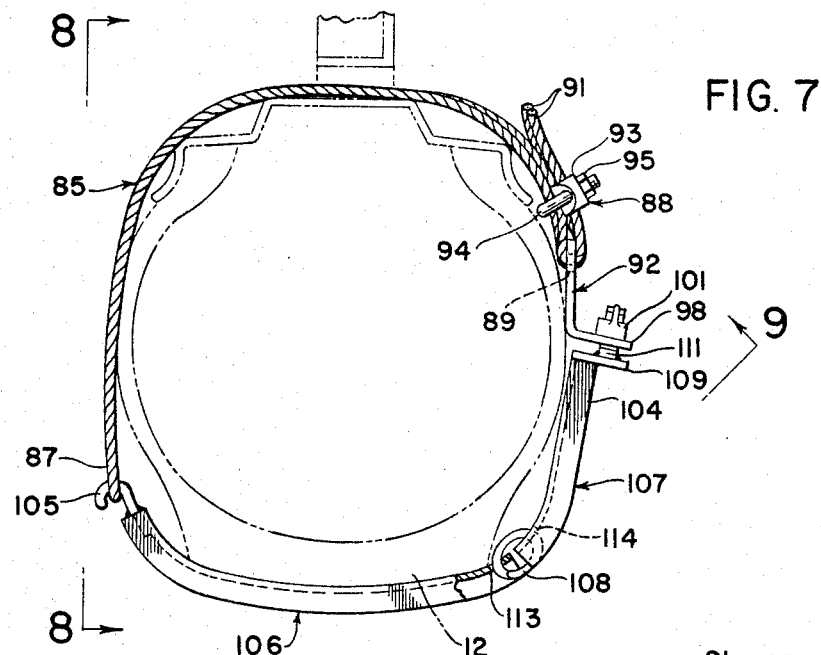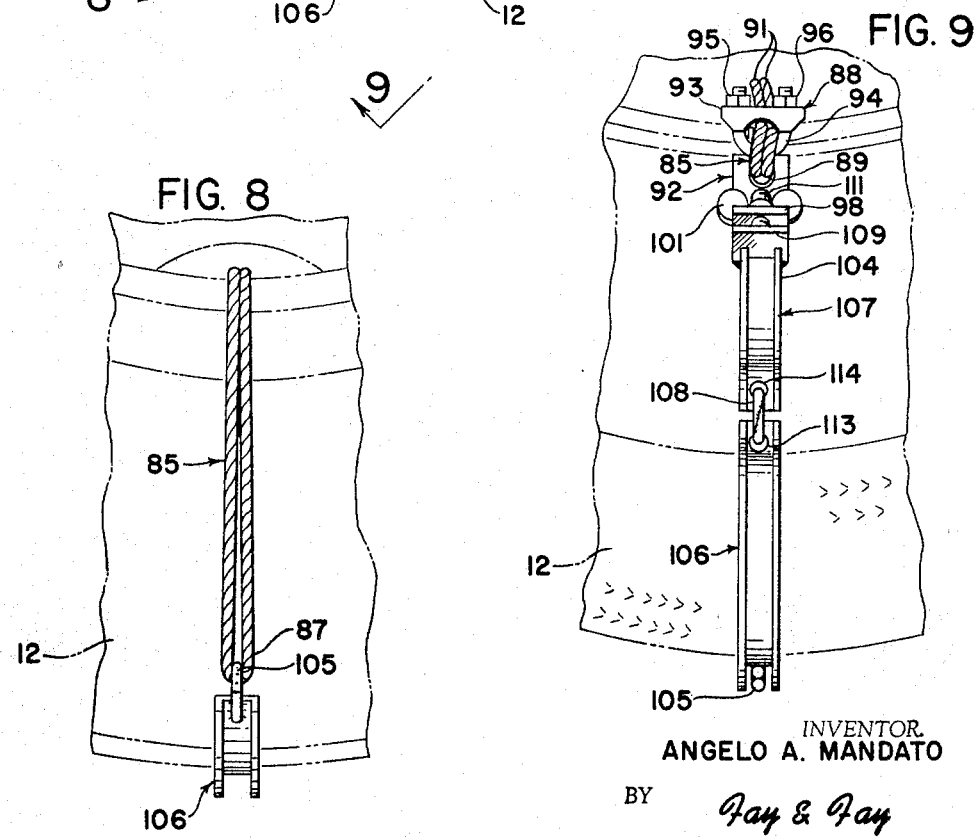

United States Patent Office 3,283,798
Patented Nov. 8, 1966

3,283,798
TRACTION DEVICE
Angelo A. Mandato, 7557 Walton Road, Bedford, Ohio
Filed Aug. 17, 1965, Ser. No. 480,401
4 Claims. (Cl. 152—237)

This invention relates to accessories for automotive vehicles, and more particularly, to a traction device for the vehicle wheels thereof. This is a continuation-in-part of application Serial No. 332,439, filed December 23, 1963 now Patent No. 3,211,205.

Heretofore, various traction devices for usage with vehicles under adverse and inclement weather conditions have been known. However, the prior art devices have proven to be ineffective because of the difficulty of installation, their susceptibility to breakage, and inadequate performance in general. For example, in using the well known chain type traction device, some way of gaining access to the entire periphery and circumference of the tire is necessary, and this often entails the elevation of the entire rear end. Also, under extreme icy conditions, the rounded biting edges provided by the chain links have proven to be inadequate in providing the desired traction. Lastly, due to the fragility of design, some of the prior art traction devices have proven to be incapable to withstand the rugged environmental conditions and have fractured thereunder. Due to the fragility of the prior art devices, considerable damage has been sustained to the fenders and other associated parts of the auto. It is to overcome these and other undesirable features of the prior art traction devices that this invention is directed.

It is an object of this invention to provide a traction device which is of basic construction and can be fabricated at a minimum cost.

It is a further object of this invention to provide a traction device that is easily mountable upon the wheels of a vehicle and which is extremely effective for any of a variety of road conditions.

It is still another object of this invention to provide a traction device that is easily mountable upon the wheels of a vehicle and which is of rugged and lasting construction, and, accordingly, able to withstand rugged usage.

It is still another object of this invention to provide a traction device which is adaptable to various sizes of vehicle wheels and tires by merely adjusting the length of an attaching cable.

In accordance with the above and first briefly described, one embodiment of my invention comprises a detachably securable traction device which is mountable upon a resilient vehicle tire. Accordingly, there is provided a two-piece, U-shaped gripping member. The two pieces are flexibly joined together to thus permit resilient contact between the gripping member and the road. The inner surface of the two-piece gripping member is flat for congruent conformity with the tire. Tire wall encompassing arms extend from opposite ends of the gripping member. One of the wall encompassing arms terminates in a hook while the other wall encompassing arm terminates in a threaded bolt-like member. A two-piece attaching unit is also provided. One piece of the two-piece attaching unit includes a non-flexible arcuate member for congruent association with a wall of the tire and terminates in a flanged end portion extending outwardly from said wall. The flange portion is provided with an aperture for receipt of the bolt-like terminating member. A metallic self-supporting, flexible cable terminating in a loop is adjustably securable to the other end of the arcuate member by way of a suitable clamping means. Accordingly, the length of the metallic cable is variable to adapt the traction unit for various size wheels and tires.

Other objects and advantages of my invention will be set forth in the claims and will be apparent from the following description, when taken in connection with the accompanying drawings in which:

FIG. 1 is a perspective view showing the traction device operatively positioned on a vehicular tire;

FIG. 2 is a front elevational view of my traction device showing the rearward working relationship thereof with some members broken away, and showing the vehicular tire in phantom;

FIG. 3 is a side elevational view showing the manner in which the gripping surfaces of my traction device encompasses an entire segmental portion of a vehicular tire including all of the tread area and wall portion thereof, and taken along the lines 3—3 of FIG. 2;

FIG. 7 illustrates a third embodiment of my traction device for use with vehicles having apertured wheel rims;

FIG. 8 is a left side elevational view taken along the line 8—8 of FIG. 7 and illustrates the working relationship of the two-piece attaching unit; and FIG. 9 is a fragmentary right side elevational view taken along the line 9—9 of FIG. 7 showing the two-piece gripping member.

Figure 4:
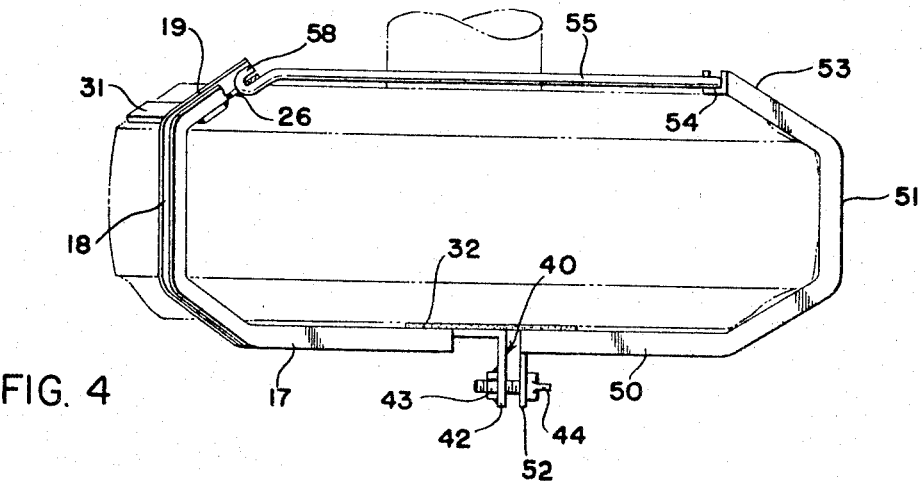
FIG. 4 illustrates the snug congruent mounting relationship of the traction device upon a typical vehicle tire and is a plan view taken along the lines 4—4 of FIG. 2.

Referring now to the drawings, there is shown in FIG. 1 a coupleable two section, 15 and 16, traction device securely mounted upon the vehicle tire 12. Section 15 includes a plurality of radially outwardly extending U-shaped gripping members 21 and 22. However, although only two U-shaped gripping members are shown, it should be appreciated that any number may be employed. As shown in the mounted position of FIG. 1, front tire wall overlying arms 17 and 23 of the gripping U-shaped members of section 15 are fixedly connected to and extend radially from a frontal and centrally located angle member 40 to result in circumferentially spaced apart gripping surfaces 18 and 24. The U-shaped gripping members 21 and 22 have tread encompassing members 18 and 24 angularly displaced from each other along the tire periphery. Also laterally extending from the tread encompassing members are radially extending, centrally directed rear wall encompassing arms 19 and 25. The rear wall encompassing arms are terminated at a point substantially removed from the center of the wheel. Furthermore, hook receiving apertures 26 and 27 are provided in respective legs 19 and 25 for receiving the connecting means of the other section of the traction device in a manner to be more fully explained hereinafter. Arcuate linking member 31 is fixedly connected along the rearward side of gripping members 21 and 22, and more specifically is connected to legs 19 and 25 at a point intermediate from the terminating ends thereof. Arcuate link 31, accordingly, provides a stabilizing effect to the gripping members 21 and 22 and prevents any displacement or movement therebetween under actual traction providing conditions.

The central, frontly located angle member 40 is shown in FIGS. 1 and 2 as having one face or side thereof, side 41, fixedly connected to the terminating ends of front tire wall encompassing arms 17 and 23. The other face of angle member 40 is shown to be extending outwardly away from the tire in a substantially perpendicular relationship to side 41. Side 42 may be provided with a threaded aperture for securing purposes, or, in the alternative, a nut 43 may be fixedly attached to face 42 coaxially with an aperture therethrough.

The other section, 16, of the traction device is shown to be extending and mounted upon tire 12 in a position substantially opposed to that of section 15. As shown in FIGS. 1 and 2, section 16 comprises only a single gripping member, however, it is possible here to also have any number of gripping members extending radially from a centrally located hub member. As shown, the U-shaped gripping member 16 is of flat inner surface construction similar to that of the gripping members of section 15 for congruous relationship with the tire tread and wall. Furthermore, member 16 is of substantially U-shaped design similar to that of section 15. Front wall overlapping arm 50 is shown terminating with an outwardly extending flange or end member 52. Member 52 has a threaded aperture therethrough for receiving locking means 44. Locking means 44 may be a conventional wing headed bolt. U-shaped member 16 is shown having a gripping member 51 which overlies and is in engagement with the full tread width of the tire. The outer surface of member 51 is channel shaped for traction purposes.

Gripping member 16 is further provided with a rear tire wall encompassing arm 53 which projects laterally and radially inwardly toward the wheel center, and which extends substantially beyond the rear wall portion of tire 12 in a manner as shown in FIG. 4. Extending transverse to leg portion 53 is a transversely oriented bar member 54, which is fixedly connected to the terminating end of leg 53 on the inward or rearward side of the vehicle tire 12. Extending longitudinally from one end of transversely oriented bar member 54 is a rod 55. Extending from the other end of the transversely oriented bar 54 is a second rod 56. Rods 55 and 56 have formed on their end hook members 58 and 57, respectively. The hooks are shown to be extending outwardly and away from the tire 12. Accordingly, hooks 57 and 58 will be inserted for securing relationship with the apertures 26 and 27 of gripping member 15 from an inwardly direction. This is best brought out in FIG. 4. It is, of course, obvious that the hooks are made to extend outwardly from the tire 12 in order to prevent any rupture or puncture thereof. As an alternative, a bifurcated hooking arrangement terminating in hook members 57 and 58 may have projected directly from the terminal point of rear arm 53.

In accordance with the invention, the traction device will be mounted on the tire in an easily, convenient, and accessible fashion. As can be seen in FIGS. 1 through 4, the traction device is operatively mounted to a vehicular tire 12 having tread portion or tread area 13 and walls 14 in a manner such that the gripping base members 18 and 24 of U-shaped section 15 and 51 of section 16 accommodate therewithin the tread area 13. The front wall of tire 12 is enclosed within front arm members 17 and 23 for section 15, and arm 50 of section 16. The rear wall of tire 12 is enclosed within rear arms 19 and 25 of section 15 and arm 53 of section 16.

As can be seen in FIG. 1, the traction device is positioned on tire 12 with angle member 40 centrally located with respect to the front of the tire and with legs 19 and 25 of the gripping members of section 15 straddling and encompassing the tire. Further, gripping members 18 and 22 are spaced about the circumference of the tire with the traction providing channel surface directed radially therefrom. Section 16 is then positioned about tire 12 such that hooks 57 and 58 are in a locking relationship with apertures 26 and 27 of rear wall arms 19 and 25. In this position, gripping member 51 will overlie tread portion 13 at a position circumferentially spaced from members 21 and 22. After section 16 has been secured, by hooking means 57 and 58, to section 15, wing screw 44 of flange member 52, of section 16, is brought into threaded engagement with nut 43 mounted on member 42 of the centrally located angle iron 40, to lock the two sections in place. Resilient pad 32 which underlies the frontal members of the traction device protects hub cap 59 from being damaged by the locking device.

When it is desired to remove the device from the tire 12, the reverse procedure is followed. Also, although it has not been expressly stated, it is, of course, possible to place a traction device such as that hereinbefore outlined on both rearward tires of the vehicle; however, it has been found that in numerous situations one such device is sufficient to extricate the vehicle.

Figure 5:
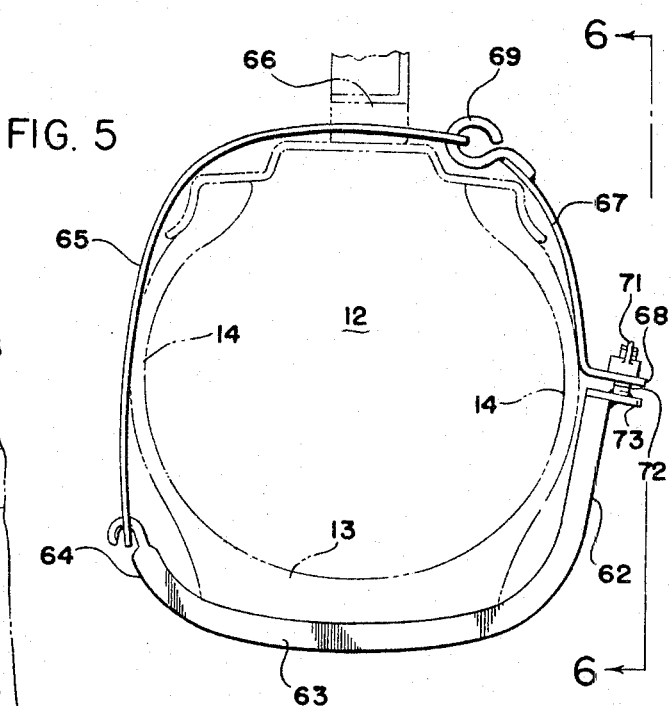
FIG. 5 illustrates a second embodiment of my traction device for use with vehicles having apertured wheel rims.
Figure 6:
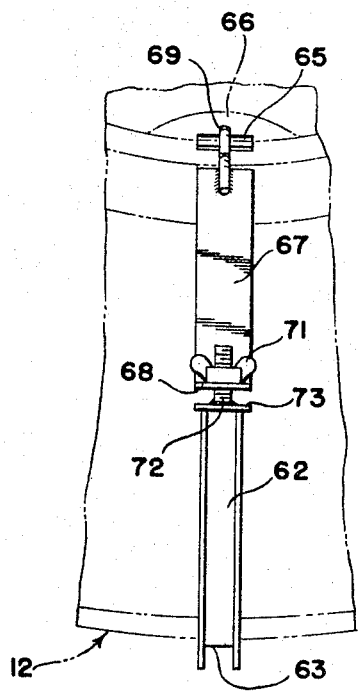
FIG. 6 illustrates the locking means utilized for my second embodiment as illustrated in FIG. 5 and is taken along the lines 6—6 thereof.

A second embodiment of my invention is shown in FIGS. 5 and 6. This embodiment is preferably for usage with cars having spoked wheels or apertures through the rims of the wheels. As shown in FIG. 5, this invention comprises a detachably securable U-shaped gripping member adapted to overlay and have one surface thereof in engagement with the full tread width, the transverse dimension of the tread, of the tire. As shown in FIGS. 5 and 6, U-shaped gripping member 63 has an underside which is flat for flush engagement with the tread surface of the tire 12, however, the outer or gripping surface is channel formed, see FIG. 6. Extending laterally and upwardly from the gripping surface 63 are tire wall overlying arms 62 and 64. The lateral extending arm 64 terminates in a hook, as shown in FIG. 5. The other arm portion, 62, terminates in a threaded bolt-like member 72. It is shown, in FIG. 5, that laterally extending arm 62 terminates in an outwardly extending flange member 73, from which projects upwardly the threaded portion 72.

Also, provided is a flexible metal strap which may be of one piece construction and is of the type that surrounds a segment of the tire. The strap may be a chain or may be of the type having at least one chain link, as shown in FIG. 5, to obtain the necessary strap flexibility and achieve the desired close fitting relationship therebetween. As shown in our FIG. 5, the preferred embodiment comprises a two piece arrangement 65 and 67. Section 65 is provided with apertures at either end thereof, an aperture at one end thereof for receiving the hook terminating end of the tire wall overlying arm 64. The second section 67 is provided with an eyelet 69 engaging the other apertured terminal of section 65. The other end of section 67 terminates in an outwardly extending flange portion 68 which has an aperture extending therethrough. To sum up, the strap may be of any well known form to enable the gripping portion of the traction means to be held juxtaposed over the entire full tread width along a segment of the tire transversely thereto.

The purpose of breaking up the strap into two segments is to provide the necessary flexibility for shaping the strap congruently about the outer surface of the walls of the tire and the rim of the wheel. It can be appreciated that if the strap was of one piece construction that as close a fit as is now attainable by our two piece construction would not be possible. Also provided is a wing bolt 71 which, after the flanged section 68 of portion 67 has received the bolt 72, the two sections are secured together by screwing the wing bolt 71 in place. In that manner a proper working condition is obtained with no possibility of the two piece traction device coming apart under operating conditions.

Accordingly, it is seen that I have provided a two piece or two section traction device comprising a U-shaped section having a base portion with a flat inner surface for engagement with the tread surface of a tire, and the outer surface thereof being channel shaped to provide the necessary gripping in adverse weather conditions. Laterally extending from the channel shaped gripping portion 63 are two wall portions 64 and 65.

As seen in FIG. 5, the wall portions extend from opposite ends of the bottom gripping surface and overlie opposite wall portions of the tire 12 while the gripping member overlays the tread of the tire. The securing strap is of two piece construction, the one piece 65 having apertures on either end thereof, one aperture engaging the hook 64 of one side wall member and the other aperture engaging the eyelet 69 of a second section 67. The opposite end of 67 terminates in an outwardly extending flange 68 having an aperture therethrough. The aperture of flange 68 mates with the bolt terminating portion 72 of side wall 62. After the strap has been put in place and the bolt threaded through the aperture of flange 68, the traction device is fixedly and securely held in place to the tire by screwing on wing nut 71.

When installing the traction device of FIGS. 5 and 6 on the vehicle tire, it is advisable to place the U-shaped section about the side of the tire and then to secure the aperture of strap 65 to the hook 64. The opposite end of the strap, more exactly section 67, is then threaded through the aperture in the wheel rim to encircle one segment of the tire 12. The bolt 72 is then passed through the aperture of flange 68 and the wing screw 71 is threadedly engaged thereto to hold the two piece section firmly in place about a segment of the wheel 12.

A third embodiment of my invention is shown at FIGS. 7-9. This embodiment is preferred to the others because of the increased ruggedness due to its flexible two-piece gripping member, and also because the tire attaching means provided is adjustable to permit quick adjustment for various size tires and rims. This embodiment is obviously for cars having spoked wheels or apertures through the rims of the wheels. As shown in FIG. 7, this invention comprises a detachably, securable two-piece U-shaped gripping member adapted to overlay and have one surface thereof in engagement with the full transverse dimension of the tread, as illustrated in FIGS. 7 and 8, the U-shaped gripping pieces 106 and 107 each have an underside which is flat for flush engagement with the tread surface of the tire 12, however, the outer or gripping surfaces are channel formed, see FIGS. 8 and 9. The adjacent ends of the U-shaped gripping pieces 106 and 107 are provided with apertures 113 and 114, respectively. A suitable linking piece 108 is then threaded through apertures 113 and 114 and clamped together. In this manner a flexible relationship between pieces 106 and 107 is provided. Extending laterally and upwardly from the outer terminal ends of gripping pieces 106 and 107, are tire wall overlying arms 105 and 104. The laterally extending arm 105 terminates in a hook, as shown in FIGS. 7 and 8. The other arm portion 104 terminates in a threaded bolt-like member 111. This is shown, in FIG. 7, the laterally extending arm 104 terminating in an outwardly extending flange member 109, from which projects the upwardly threaded portion 111.

A two piece attaching unit is also provided. FIGS. 7 and 8 illustrate the preferred embodiment comprising the attaching unit 85 and 92. Section 92 is provided with an aperture 89 proximate the terminal end thereof, while the opposite end terminates in an outwardly extending flange portion 98. The outwardly extending flange portion 98 is also provided with an aperture therethrough. Section 85 is a flexible self-supporting metallic cable. The cable being turned in upon itself to provide a suitable loop or bight portion 87. The ends 91 of the cable are threaded through aperture 89 of section 92. The length of the ends which extend and are threaded through aperture 89 provided means for adjusting the length of the cable. After predetermined lengths of ends 91 have been threaded through aperture 89 the ends are fixedly attached to the main body portion of cable 85 by a suitable clamping means. In this instance we have found that a U-bolt 88 provides a suitable clamping means. U-bolt 88 is provided with a main U-shaped portion having its terminal ends threaded. A yoke 93 is removably mountable upon the threaded terminal ends of the U-shaped member. Threaded locking means 95 and 96 are then provided for locking the yoke member 93 to the main U-shaped member. The cable 85 and cable ends 91 being secured between the yoke 93 and the main U-bolt body member 94 in a locked position.

To sum up, the attaching member may be of any well known form to enable the gripping member of the traction means to be held juxtaposed over the entire full tread width along a segment of the tire transversely thereto.

By utilizing a flexible yet self-supporting metallic cable I have found that the attaching member is resilient enough for shaping the attaching means congruently about the upper outer surface of the wall to the tire and the rim of the wheel, while at the same time providing suitable rigidity to permit blind or unassisted attachment to the hook of arm 105. It can be appreciated that if the attaching member was of non-flexible metallic material that as close a fit that is now attainable by the above described attaching member would not be possible. Also provided is a wing nut 101 which, after the flanged section 98 of portion 92 has received the bolt 111, the two sections are secured together by screwing the wing nut 111 in place. In this manner a proper coupling of the gripping unit to the tire is obtained with no possibility of the traction device being uncoupled during operating conditions.

Accordingly, it is seen that I have provided a two piece flexibly joined U-shaped gripping member. By use of a flexibly joined gripping member I have found that the life of the traction device is greatly increased over a one piece design. Experimentation has proved that the impact force between the single piece gripping members and the road results in a short duration for gripping member of unitary design. On the other hand, by use of the flexible two piece or plural gripping members I have found that the life is greatly enhanced and extended. It should, of course, be appreciated that the linking piece 108 is of metallic material and is not susceptible to fracture or breakage due to repeated impact between the traction device and the road upon which it will be used.

Cable 85 can be what is commonly called a wire rope. It, accordingly, is capable of self-support in that it normally is capable of withstanding or supporting its own weight. On the other hand, it is also capable of conforming to any desired shape by the application of a minimal of shaping force.

When installing the traction device of FIGS. 7-9 on the vehicle tire, it is advisable to hold the two-piece U-shaped gripping members upon the tread portion of the tire. With the other hand the self-supporting metallic cable of the two section attaching member is then passed through an aperture in the wheel rim and singlehandedly hooked upon the hook terminal end of wall portion 105. Finally, the attaching member is locked in place by passing the bolt-like member 111 through the aperture in the flange 98. The wing nut can then be screwed on to prevent any decoupling of the device under operation. It can, accordingly, be seen that I have provided a traction device which is capable to be mounted from an outward position of the tire and thus prevent any soiling of clothes during the mounting. Furthermore, the cable is made of self-supporting metallic material and I am able to conveniently thread the cable through the aperture of the wheel rim and hook the appropriate hooked end of the gripping member with no amount of luck or guesswork being necessary.

All of the known prior art devices employ flexible straps or flexible gripping members, or both, and it is, accordingly, necessary for the person mounting them to the tire to reach around the tire with his arm, body, or both, and thereby attach the two-piece traction device together. This has proved to be both physically and mentally challenging to most people and has been especially unappreciated by women.

My device, on the other hand, because of the unique design of the gripping members and the self-supporting nature of the cable is capable of being mounted with a minimum of effort from a position outwardly of the tire. All that is required is that the applier use one hand to hold the U-shaped gripping pieces to the tread segment of the tire and with the other hand single-handedly thread the self-supporting metallic cable through the rim of the tire and hook the bight thereof to the hooked terminal wall portion of the gripping member. All that remains thereafter is to secure the other piece of the attaching unit by bolting the outwardly extending flanged portion 98 to the bolt-like terminal portion 111. This bolting action, of course, is done outwardly of the tire. It can thus be appreciated that my device permits a car owner to secure a traction device from a position outwardly the tire without having to soil his clothing and hands by reaching around to the inner portion of the tire as is the case in the prior art two-piece traction devices which utilize either non-flexible gripping members, a non-flexible strap member, or both a non-flexible strap member or gripping member together.

While it will be apparent that the embodiments of this invention herein disclosed are well calculated to fulfill the objects of the invention, it will be appreciated that the invention is susceptable to modification, variation and change, without departing from the proper scope or fair meaning of the subjoined claims.

I claim:

1. A traction device securable about a tire juxtaposed the tread and overlying the full tread width along a circumferential segment of the tire comprising flexibly joined U-shaped gripping members, said gripping members each having a flat inner surface for congruent conformity with the tread of said tire, wall encompassing arms extending from the extreme outer ends of the U-shaped gripping members, said wall encompassing arms overlying opposite wall portions of the tire while the gripping member overlies the tread, a hook formed at a terminal end of one of said wall encompassing arms and the other wall portion terminating in a threaded bolt-like member, a two-piece adjustable length attaching member, a first piece thereof being non-flexible and having an arcuate shape for congruent association with a wall of the tire and the wheel rim, and terminating in a flanged portion having an aperture therethrough for receipt of said bolt-like terminating member, a self-supporting cable having a bight at one end for engagement with the hooked end of the other tire wall encompasing arm, the other end of said cable being adjustably secured to the other end of said first piece of said two-piece attaching member, so that the length of said cable may be varied in accordance with the size of the wheel and tire to which the traction device is to be mounted.

2. A traction device securable about a tire juxtaposed the tread and overlying the full tread width along a circumferential segment of the tire comprising two flexibly joined U-shaped gripping members, said gripping members each having a flat inner surface for congruent conformity with the tread of said tire, wall encompassing arms extending from the outer ends of the U-shaped gripping members, said wall encompassing arms overlying opposite wall portions of the tire while the gripping member overlies the tread, a hook formed at a terminal end of one of said wall encompassing arms and the other wall portion terminating in a threaded bolt-like member, a two-piece adjustable length attaching member, a first piece thereof being non-flexible and having an arcuate shape for congruent association with a wall of the tire and the wheel rim, and terminating in a flanged portion having an aperture therethrough for receipt of said bolt-like terminating member, means for holding said flanged portion in fixed relation to said bolt-like member, and a self-supporting cable formed with a bight at one end for engagement with the hooked end of the other tire wall encompassing arm, the other ends of said cable being adjustably secured to the other end of said first piece of said two-piece attaching member, so that the length of said cable may be varied in accordance with the size of the wheel and tire to which the traction device is to be mounted, said traction device being mountable to a tire from a position outwardly of said tire by holding said U-shaped gripping members upon said tread portion of said tire, passing said bight of said self-supporting cable through an aperture in the wheel rim and hooking said bight to said hook terminal end of said wall arm and finally locking said flanged terminal end of said second piece of said two-piece attaching member to said bolt terminal members.

3. A traction device securable about a tire juxtaposed the tread and overlying the full tread width along a circumferential segment of the tire comprising flexibly joined U-shaped gripping members, said gripping members each having a flat inner surface for congruent conformity with the tread of said tire, wall encompassing arms extending from the extreme outer ends of the U-shaped gripping members, said wall encompassing arms overlying opposite wall portions of the tire while the gripping member overlies the tread, a hook formed at a terminal end of one of said wall encompassing arms and the other wall portion terminating in a threaded bolt-like member, a two-piece adjustable length attaching member, a first piece thereof being non-flexible and having an arcuate shape for congruent association with a wall of the tire and the wheel rim, and terminating in a flanged portion having an aperture therethrough for receipt of said bolt-like terminating member, a self-supporting cable turned back upon itself to form a loop for engagement with the hooked end of the other tire wall encompassing arm, cable clamping means clamping said ends of said cable after the same has been threaded through a second aperture to said cable, the ends of said cable being threaded through said second aperture through the other end of said first piece of said two-piece attaching member, the length of said cable being adjustable by way of said cable clamping means to accommodate different wheel and tire sizes to which the traction device is to be mounted.

4. The combination as described in claim 3 wherein said cable clamping means is a U-bolt.

References Cited by the Examiner
UNITED STATES PATENTS

| | | | |
|---|---|---|---|
| 1,470,819 | 10/1923 | Eder | 152—228 |
| 1,494,862 | 5/1924 | Neller | 152—228 |
| 2,035,299 | 3/1936 | Cummings | 152—228 |

ARTHUR L. LA POINT, *Primary Examiner.*

EUGENE G. BOTZ, *Examiner.*

C. W. HAEFELE, *Assistant Examiner.*